United States Patent [19]

Petro

[11] Patent Number: 4,487,187
[45] Date of Patent: Dec. 11, 1984

[54] ELECTRONICALLY CONTROLLED FLUID FLORO REGULATING SYSTEM

[76] Inventor: Don Petro, 228 Pinecrest Crescent NE., Calgary, Alberta, Canada, T1Y 1K9

[21] Appl. No.: 462,360

[22] Filed: Jan. 31, 1983

[30] Foreign Application Priority Data

Dec. 10, 1982 [CA] Canada ................................ 417453

[51] Int. Cl.³ ............................................ F02M 51/00
[52] U.S. Cl. .................................. 123/478; 123/430; 123/486
[58] Field of Search ................ 123/478, 486, 488, 430

[56] References Cited

U.S. PATENT DOCUMENTS

| | | | |
|---|---|---|---|
| 3,575,145 | 4/1971 | Steiger ................................ | 123/478 |
| 3,669,081 | 6/1972 | Monpetit . | |
| 3,688,750 | 9/1972 | O'Neill . | |
| 3,689,753 | 9/1972 | Williams et al. . | |
| 3,689,755 | 9/1972 | Hodgson et al. . | |
| 3,851,635 | 12/1974 | Murtin et al. ........................ | 123/478 |
| 3,933,135 | 1/1976 | Zillman et al. . | |
| 3,971,348 | 7/1976 | Scofield . | |
| 4,034,721 | 7/1977 | Lenzi et al. ......................... | 123/486 |
| 4,048,964 | 9/1977 | Kissel . | |
| 4,058,709 | 11/1977 | Long ................................... | 123/478 |
| 4,108,115 | 8/1978 | Williams et al. . | |
| 4,140,088 | 2/1979 | du Vulpillieres ................... | 123/478 |
| 4,147,137 | 4/1979 | Firey ................................... | 123/430 |
| 4,155,332 | 5/1979 | Yaegashi et al. . | |
| 4,172,433 | 10/1979 | Bianchi et al. . | |
| 4,200,064 | 4/1980 | Engele . | |
| 4,205,377 | 5/1980 | Oyama et al. . | |
| 4,209,829 | 6/1980 | Leichle . | |
| 4,212,066 | 7/1980 | Carp et al. . | |
| 4,245,312 | 1/1981 | de Vulpillieres . | |

FOREIGN PATENT DOCUMENTS

| | | |
|---|---|---|
| 815179 | 6/1969 | Canada . |
| 988608 | 5/1976 | Canada . |
| 988609 | 5/1976 | Canada . |
| 1008538 | 12/1977 | Canada . |
| 1072656 | 2/1980 | Canada . |
| 139365 | 12/1979 | Fed. Rep. of Germany ...... 123/478 |

*Primary Examiner*—Parshotam S. Lall
*Attorney, Agent, or Firm*—Shapiro and Shapiro

[57] ABSTRACT

This invention relates to the precision control of the rate of fluid flow in fluid conducting lines, and is particularly applicable to the control of gaseous fuel to an internal combustion engine. The fluid is caused to flow through a plurality of parallel lines each of which contains a solenoid valve operated by digital signals from an electronic digital processor. A plurality of sensors associated with the internal combustion engine monitor operating parameters, and provide signals to the electronic digital processor representative of the parameters. The relative flow rates of the lines are proportional to successive powers of two, and are determined by orifices in the lines which provide the above-noted relation flow rates in said lines at pressure differentials thereacross which are at or above that necessary to provide critical or choked flow in such orifices. The electronic digital processor automatically programs the solenoid valves to provide the required total fuel flow rate for any particular set of operating conditions indicated by the signals from the sensors.

31 Claims, 8 Drawing Figures

ELECTRONICALLY CONTROLLED FLUID FLORO REGULATING SYSTEM

BACKGROUND OF THE INVENTION

This invention relates to precision control of a flow of fluid in fluid conducting lines, and applies particularly, though not exclusively, to the control of gaseous fuel to an internal combustion engine. Still more specifically, the invention relates to the control of fuel supply to internal combustion engines by means of electronic digital controls.

Two major problems are encountered today in the design of internal combustion engines and fuel systems therefor, viz., shortage and consequent high cost of gasoline and other liquid fuels with the attendant need to minimize fuel consumption, and the pollution of the environment with the attendant need to reduce the emission of noxious gases. One of the requirements arising out of these needs is that of accurate control of fuel supply in response to operating conditions and engine parameters.

One approach to the alleviation of the above-noted problems is the use of gaseous fuels such as natural gas (methane) and propane which show great promise as an alternative to gasoline as a power source for motor vehicles. It has been recognized that the increased use of gaseous fuels for internal combustion engines would reduce the amount of oil which must be imported into countries such as Canada and the United States. There is at present a sufficient supply of gaseous methane and propane to permit such expanded use. The principal source of methane is now natural gas. However, it can be produced from coal and waste biological products which are renewable. Methane and propane are also attractive because they produce less polluting exhaust products.

Italy pioneered extensive use of natural gas in motor vehicles, and consequently most of the conversion kits available in North America are direct Italian imports, or copies of the Italian designs. The known designs are based on a venturi mounted above the carburetor coupled to a vacuum actuated diaphragm regulator. Fundamental problems exist in this approach, problems that are not as apparent in the short range small vehicle environment of Europe, but are major obstacles to the acceptance of gas in North America.

SUMMARY OF THE INVENTION

The present invention proposes a new concept that will replace the venturi-diaphragm system with a regulator capable of directly converting electronic digital signals into a gas flow directly and accurately proportional to these digits. The invention permits a high degree of system sophistication to be achieved at very low cost. Moreover, with the system proposed in this invention fuel flow can be controlled within very narrow limits in response to digital signals from an electronic processor. The key element in the proposal is an electromechanical device (EDGAR*) capable of actuating the electronic digital input, and providing a fuel flow which is adjustable in small discrete steps. The acronym EDGAR stands for "electronic digital to analog gas regulator".

*Trademark

Already a number of attempts have been made to replace the traditional analogue venturi-diaphragm fuel supply system with a digital system employing electronic controls, especially micro processors. Examples of fuel control systems are found in Canadian Pat. No. 1,008,538 and U.S. Pat. Nos. 3,688,750; 3,933,135; 4,200,064; 4,205,377; and 4,212,066.

However, systems which have utilized electronic digital processors to monitor gasoline flow to internal combustion engines are generally quite complex and hence expensive and difficult to maintain. The applicant's system by contrast with those of the prior art is relatively simple, and yet is capable of providing a very accurate control of fluid flow.

It is an object of the present invention to provide a novel apparatus for controlling the rate of flow of fluid to be utilized at a destination wherein the rate of flow of fluid is controlled by means of digital signals.

It is a further object of this invention to provide an apparatus for controlling the rate of flow of fluid for an internal combustion engine wherein the rate of flow of fluid is controlled in a plurality of parallel fluid conducting lines by programming of selected lines to fully open and fully closed positions by means of an electronic processor.

In accordance with a broad aspect of the invention there is provided apparatus for controlling the rate of flow of compressible fluid from a source to a destination including a plurality of fluid conducting lines, the relative flow rates through said fluid conducting lines being proportional to preselected values (preferably values proportional to successive powers of two for reasons which will become apparent) when the pressure differential across said lines is sufficient to create choked flow conditions therein. The apparatus includes means to connect said plurality of fluid conducting lines in parallel between said source and said destination. A control valve is located in each of said fluid conducting lines, each said control valve being operable to fully open and fully closed positions. An electronic control means controls selectively the opening and closing of each of said valves. When fluid is supplied from said source to said plurality of fluid conducting lines at a pressure sufficiently high as to provide the above-noted pressure differential, the fluid flow rate in each of said lines is independent of fluid pressure changes at said destination. Hence the total fluid flow arriving at the destination via said plurality of fluid conducting lines is controllable in discrete steps as said valves are selectively opened and closed to provide a plurality of predetermined fluid flow rates. In the preferred form of the invention these total flow rates are proportional to a series of binary numbers.

One preferred form of the invention provides an electronically controlled fuel system for an internal combustion engine. This system typically includes a plurality of fluid conducting lines connected in parallel and having relative fluid carrying capacities proportional to powers of two when operating under choked flow conditions. A solenoid control valve is located in each of the fluid conducting lines, each of said solenoid control valves being operable to fully open and fully closed positions. An electronic processor is arranged to control selectively the opening and closing of each of said valves by means of digital signals applied to the solenoids. A sensor means to generate electrical signals indicative of the operating parameters of said internal combustion engine is provided, said electrical signals being applied to the electronic processor. An air/fuel mixer having an input to which the combined output of said plurality of fluid conducting lines is connected is also provided and its output is connected to said internal combustion engine. Also provided is means to supply fuel to said plurality of fluid conducting lines at a pressure sufficiently high that the fluid flow in each of said lines is independent of the back pressure at the input to said air/fuel mixer i.e. the pressure differential thereacross is sufficient to provide choked flow conditions therein. Said electronic processor automatically adjusts the combined fluid flow from said plurality of fluid conducting lines in a series of discrete steps by opening and closing said control valves in response to the fuel requirements of said internal combustion engine as indicated by the electrical signals generated by the sensor means.

BRIEF DESCRIPTION OF THE VIEWS OF DRAWINGS

An exemplary embodiment of the invention will now be described in conjunction with the accompanying drawings in which.

DETAILED DESCRIPTION OF PREFERRED EMBODIMENTS

Figure 1:
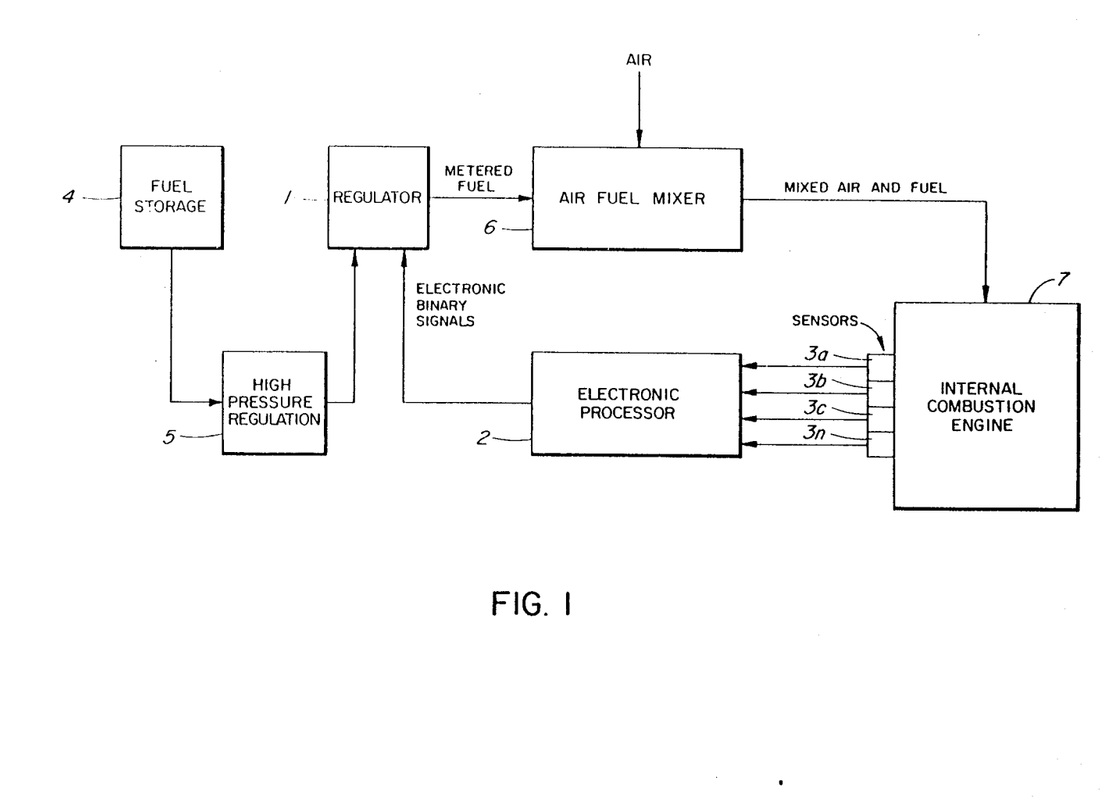
FIG. 1 is a block diagram illustrating a gaseous fuel system for an internal combustion engine with digital control of fuel gas flow by means of an electronic processor.

The key element of the fuel regulation system illustrated in the block diagram of FIG. 1 is the electronic digital to analog gas regulator 1. This is an electromechanical device designed to be operated by digital electronic signals from an electronic processor so as to produce an analog gas output adjustable in many discrete steps by means of the digital signals.

The electronic processor 2, manipulates the data from a plurality of sensors 3a to 3n, and converts this data into binary digital signals, which accurately represent the fuel requirements of the engine at a particular time, and which are applied to the electronic digital to analog regulator in a manner which will be more fully described hereinafter. It should be noted here that the electronic processor 2 can be of any suitable design. In one form of processor also to be described in further detail hereafter the data from the sensors 3a to 3n is manipulated by analog electrical circuitry with the results being converted to digital form simply as an interface to the electromechanical flow arrangement to be described hereafter. In other typical arrangements, the data from the sensors can be converted to digital form at the outset and manipulated by a programmable digital processor, e.g. a microcomputer, of any suitable and well known design. Since the science of manipulating data from sensors by electronic means is very well known it is believed that an extensive description of the electronic processor 2 is unnecessary although, for the convenience of the reader, one form of processor will be described hereafter. The main point to keep in mind is that the processor 2, regardless of its exact design, produces a digital output, i.e. a binary output, representing the desired fluid flow.

Sensors $3a$, $3b$, $3c$, ... $3n$ detect the various parameters which affect engine performance such as: engine temperature, engine r.p.m., throttle position, intake air mass flow, and composition of exhaust gases. Each sensor produces an electrical signal indicative of the value of the parameter it measures, and the signals produced by the various sensors are applied to inputs of the electronic digital processor 2.

Fuel, usually methane or propane, is stored in fuel storage tank 4 at pressures which may be 3000 psi or more depending on economic and safety considerations. Pressure is reduced in high pressure regulator 5 to approximately 100 psi for application to the electronic digital to analog regulator. The metered fuel from the electronic digital to analog regulator is applied to the air stream in the air/fuel mixer 6 from whence the mixed air and fuel are fed to the intake of the internal combustion engine 7.

Figure 2:
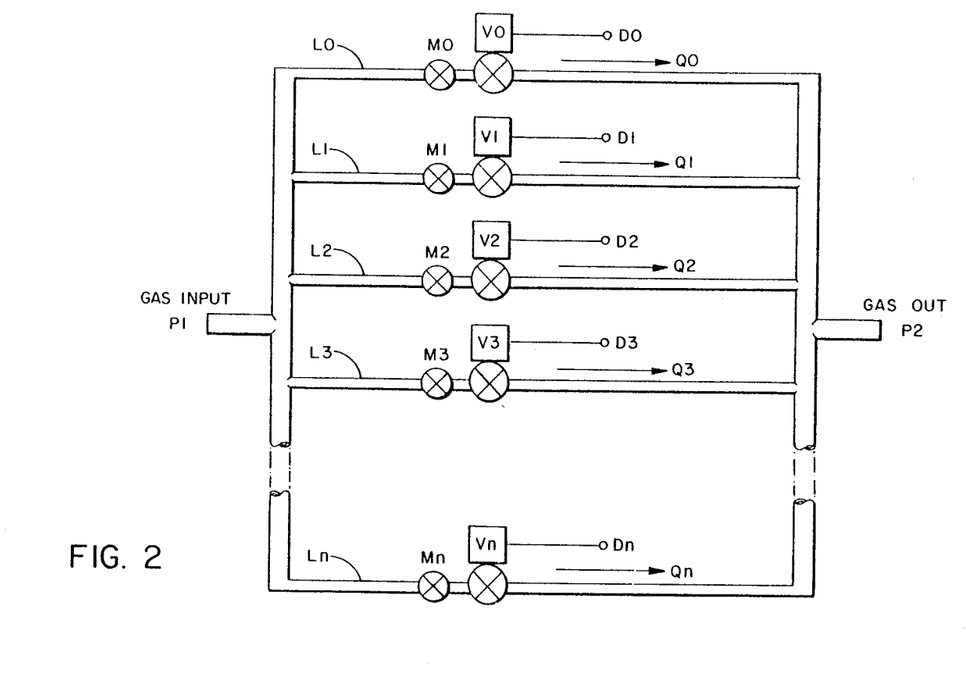
FIG. 2 is a diagram illustrating the electronic digital to analog regulator of the described embodiment of the invention.
Figure 3:
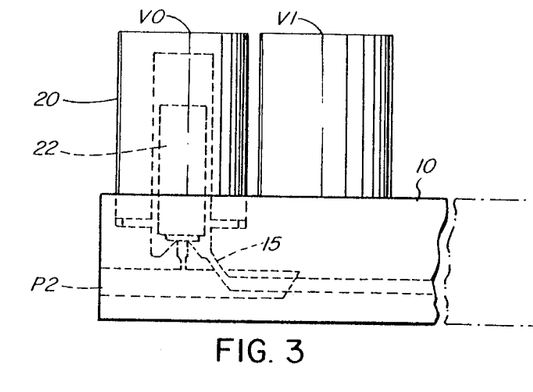
FIG. 3 is a side elevation view of a solenoid valve and manifold arrangement employing the features of the invention.
Figure 4:
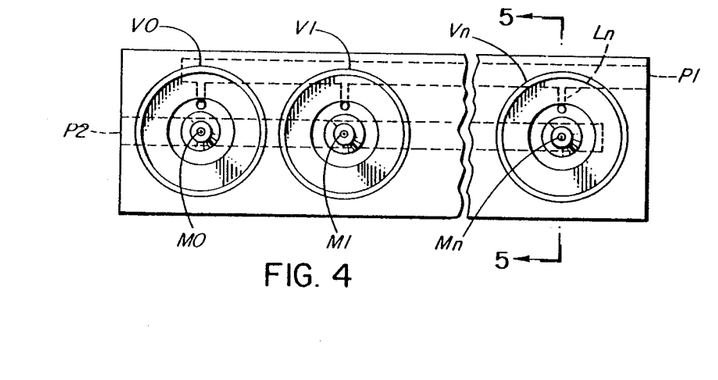
FIG. 4 is a plan view of the structure of FIG. 4.
Figure 5:
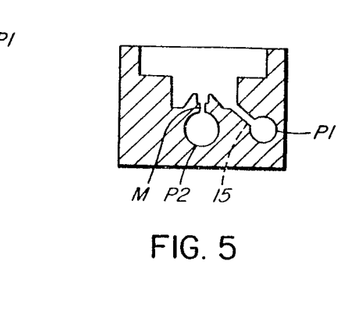
FIG. 5 is a section view taken along line 5—5 in FIG. 4.
Figure 6:
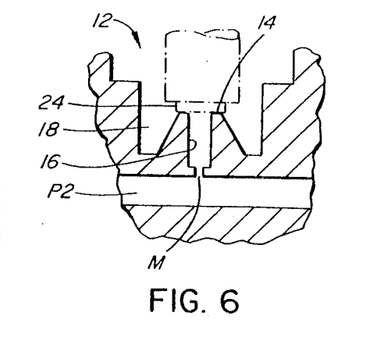
FIG. 6 is an enlarged section view showing the valve seat and orifice in greater detail.

The electronic digital to analog regulator shown in FIG. 2, will now be described. It is seen to consist of a plurality of fluid conducting lines $L0$, $L1$, $L2$ ... $Ln$ connected in parallel between a common input or source P1 and a common output or destination P2. In each of the fluid conducting lines there is a solenoid valve controlled by signals from the electronic digital processor to either fully on or fully off position. Also included in each line is a metering orifice, the dimensions of which determine the fluid carrying capacity of the particular line at the selected inlet pressure.

Gas supplied at the inlet port P1 at a constant pressure appears at the input of metering orifices $M0$, $M1$, $M2$, $M2$, ... $Mn$. In series with each metering orifice is an electrically actuated solenoid valve $V0$, $V1$, $V2$, $V3$, ... $Vn$, each having an input $D0$, $D1$, $D2$, $D3$ ... $Dn$ for binary signals from processor 2. The values of gas flow metered by $M0$, $M1$, $M2$, $M3$, ... $Mn$ are $Q0$, $Q1$, $Q2$, $Q3$, ... $Qn$ respectively. Depending on the combination of valves V that are electrically opened, the gas flows will combine at the output P2 to give the sum $Q0 + Q1 + Q2 + Q3$ ... $+ Qn$.

Fluid mechanics dictates that if there is a large enough pressure differential between the gas at inlet port P1 and the gas at output port P2 then the flow in the orifice throat will be at sonic velocity, such flow being known as critical or choked flow. Under this flow condition a further decrease in pressure at output port P2 cannot affect the pressure in the orifice throat or the mass flow rate. So long as critical or choked flow conditions are maintained the mass of gas passing through each line per unit time will be directly proportional to the pressure at inlet port P1. This phenomena is, per se, well known, reference being had to "Fluid Mechanics With Engineering Applications", Robert L. Daugherty et al., 7th Edition, McGraw-Hill Book Company, pages 259–261 and equation 9.25. In the operation of the present system the pressure differential between inlet port P1 and output port P2 is always such that each of the orifices operates in the choked or critical flow condition when fluid is flowing therethrough. That is, the inlet-outlet pressure differential is always maintained at or above the critical value. In any particular application the inlet pressure at port P1 is held constant. An inlet pressure of 100 psig is a typical input pressure when the present system is used to supply a large (454 c.i.d.) engine. The same basic system can thus be used, with no orifice size change, to supply smaller engines by simply reducing the inlet pressure in port P1 by an appropriate amount so long as choked or critical flow conditions are maintained in the orifices. The resulting saving in inventory by having one calibrated system for use with a wide variety of sizes of engines, or other users, provides a substantial cost advantage.

Metering orifices M1, M2, M3, . . . Mn regulate the gas flows Q0, Q1, Q2, Q3, . . . Qn such that the gas flow from each line contributes a different amount to the total gas output. The contribution of each metering orifice M, contributing a gas flow Q, is weighted according to its position in the binary number series. The values of the gas flows Q0, Q1, Q2, Q3, . . . Qn in the fuel conducting lines L0, L1, L2, L3, . . . Ln obey the following mathematical relationship:

$Q0 = 2^0 Q0 = 1 \times Q0$.
$Q1 = 2^1 Q0 = 2 \times Q0$.
$Q2 = 2^2 Q0 = 4 \times Q0$.
$Q3 = 2^3 Q0 = 8 \times Q0$.
$Qn = 2^n Q0 = 2^n \times Q0$.

Rate of flow in any one of the fluid conducting lines L0, L1, L2, L3, . . . Ln, when the associated solenoid valve is open, is dependent on the dimensions of the orifices of metering orifices M0, M1, M2, M3, . . . Mn. Hence, the accuracy of control of gas flow is in turn dependent on the accuracy of these dimensions. The orifices operate, as noted above, in a choked flow condition so that the rate of flow of fluid through each orifice is constant at constant inlet pressure. The number of increments of gas flow provided by "n" number of fluid conducting lines in the binary weighted system is $2^n - 1$. The following listing shows the number of such increments for various numbers of lines.

| NUMBER OF LINES | NUMBER OF INCREMENTS |
| --- | --- |
| 4 | 15 |
| 5 | 31 |
| 6 | 63 |
| 7 | 127 |
| 8 | 255 |
| 9 | 511 |
| 10 | 1,023 |

The above relationship illustrates how very high "resolution" can be obtained with a reasonable number of valves.

The resolution of such a system is a percentage which one of the incremental steps, which is equal to Q0, is of the maximum gas flow $Q0+Q1+Q2+Q3+ \ldots Qn$. Thus, for a system with n lines the resolution R is given by the equation $$R = \frac{1}{2^n - 1} \times 100.$$

For values of n of 5, 6, 7 and 8 the resolutions are 3.23%, 1.59%, 0.79% and 0.39%. The above values of n are expected to cover the majority of practical applications. Suppose, for example, that a system requires a maximum flow rate of 31.0 standard cubic feet perminute (scfm) at a resolution of 4.0%. The number of increments available with 5 bits is 31 so the least significant bit $Q_0$ is chosen as 1 scfm.

Binary weighting determines the values of $Q_1$, $Q_2$, $Q_3$, and $Q_4$.

$Q0 = 2^0 Q0 = 1 \times 1 = 1$ scfm
$Q1 = 2^1 Q0 = 2 \times 1 = 2$ scfm
$Q2 = 2^2 Q0 = 4 \times 1 = 4$ scfm
$Q3 = 2^3 Q0 = 8 \times 1 = 8$ scfm
$Q4 = 2^4 Q0 = 16 \times 1 = 16$ scfm Accordingly, to provide the required resolution five lines are needed for values of Q0, Q1, Q2, Q3, and Q4 of 1, 2, 4, 8 and 16 scfm respectively. All combinations of the flow rates for the system are shown in Table 1. (Electronic digital input 1 causes the solenoid involved to be energized and to open the valve, and an electronic digital input 0 causes the solenoid to be deenergized and to close the valve.)

Thus far, the flow rates of the respective lines have been described as being proportional to successive powers of 2. It is theoretically possible to use a base other than 2, as, for example, a base of 1.9. In this case the incremental value of each step is variable and the function is non-linear as a few simple calculations will show. If a non-linear system matching that produced by the fractional base were desired, the system would probably work. However, in most cases, fractional bases give complex results, almost useless for practical purposes, and hence the use of the base 2 is greatly to be preferred.

TABLE 1

| ELECTRONIC DIGITAL INPUT | | | | | GAS (SCFM) DIGITAL EQUIVALENT | |
| --- | --- | --- | --- | --- | --- | --- |
| VALVE $V_4$ $D_4$ | VALVE $V_3$ $D_3$ | VALVE $V_2$ $D_2$ | VALVE $V_1$ $D_1$ | VALVE $V_0$ $D_0$ | WEIGHT 16 $Q_4$ | WEIGHT = 8 $Q_3$ |
| 0 | 0 | 0 | 0 | 0 | 0 | 0 |
| 0 | 0 | 0 | 0 | 1 | 0 | 0 |
| 0 | 0 | 0 | 1 | 0 | 0 | 0 |
| 0 | 0 | 0 | 1 | 1 | 0 | 0 |
| 0 | 0 | 1 | 0 | 0 | 0 | 0 |
| 0 | 0 | 1 | 0 | 1 | 0 | 0 |
| 0 | 0 | 1 | 1 | 0 | 0 | 0 |
| 0 | 0 | 1 | 1 | 1 | 0 | 0 |
| 0 | 1 | 0 | 0 | 0 | 0 | 8 |
| 0 | 1 | 0 | 0 | 1 | 0 | 8 |
| 0 | 1 | 0 | 1 | 0 | 0 | 8 |
| 0 | 1 | 0 | 1 | 1 | 0 | 8 |
| 0 | 1 | 1 | 0 | 0 | 0 | 8 |
| 0 | 1 | 1 | 0 | 1 | 0 | 8 |
| 0 | 1 | 1 | 1 | 0 | 0 | 8 |
| 0 | 1 | 1 | 1 | 1 | 0 | 8 |
| 1 | 0 | 0 | 0 | 0 | 16 | 0 |
| 1 | 0 | 0 | 0 | 1 | 16 | 0 |

TABLE 1-continued

| | | | | | | |
|---|---|---|---|---|---|---|
| 1 | 0 | 0 | 1 | 0 | 16 | 0 |
| 1 | 0 | 0 | 1 | 1 | 16 | 0 |
| 1 | 0 | 1 | 0 | 0 | 16 | 0 |
| 1 | 0 | 1 | 0 | 1 | 16 | 0 |
| 1 | 0 | 1 | 1 | 0 | 16 | 0 |
| 1 | 0 | 1 | 1 | 1 | 16 | 0 |
| 1 | 1 | 0 | 0 | 0 | 16 | 8 |
| 1 | 1 | 0 | 0 | 1 | 16 | 8 |
| 1 | 1 | 0 | 1 | 0 | 16 | 8 |
| 1 | 1 | 0 | 1 | 1 | 16 | 8 |
| 1 | 1 | 1 | 0 | 0 | 16 | 8 |
| 1 | 1 | 1 | 0 | 1 | 16 | 8 |
| 1 | 1 | 1 | 1 | 0 | 16 | 8 |
| 1 | 1 | 1 | 1 | 1 | 16 | 8 |

| GAS (SCFM) DIGITAL EQUIVALENT | | | GAS ANALOG OUTPUT (SCFM) |
|---|---|---|---|
| WEIGHT = 4 $Q_2$ | WEIGHT = 2 $Q_1$ | WEIGHT = 1 $Q_0$ | SUM |
| 0 | 0 | 0 | 0 |
| 0 | 0 | 1 | 1 |
| 0 | 2 | 0 | 2 |
| 0 | 2 | 1 | 3 |
| 4 | 0 | 0 | 4 |
| 4 | 0 | 1 | 5 |
| 4 | 2 | 0 | 6 |
| 4 | 2 | 1 | 7 |
| 0 | 0 | 0 | 8 |
| 0 | 0 | 1 | 9 |
| 0 | 2 | 0 | 10 |
| 0 | 2 | 1 | 11 |
| 4 | 0 | 0 | 12 |
| 4 | 0 | 1 | 13 |
| 4 | 2 | 0 | 14 |
| 4 | 2 | 1 | 15 |
| 0 | 0 | 0 | 16 |
| 0 | 0 | 1 | 17 |
| 0 | 2 | 0 | 18 |
| 0 | 2 | 1 | 19 |
| 4 | 0 | 0 | 20 |
| 4 | 0 | 1 | 21 |
| 4 | 2 | 0 | 22 |
| 4 | 2 | 1 | 23 |
| 0 | 0 | 0 | 24 |
| 0 | 0 | 1 | 25 |
| 0 | 2 | 0 | 26 |
| 0 | 2 | 1 | 27 |
| 4 | 0 | 0 | 28 |
| 4 | 0 | 1 | 29 |
| 4 | 2 | 0 | 30 |
| 4 | 2 | 1 | 31 |

An embodiment of the invention will be described in further detail with reference to FIGS. 3–6. As shown, the several solenoid control valves V0, V1, . . . Vn are connected to and along an elongated manifold 10, the latter having recesses 12 therein to receive the solenoids of the several control valves. The manifold 10 is also drilled in the lengthwise direction to provide a pair of spaced elongated ports, i.e. inlet port P1 and output port P2, both of which are common to the several solenoid control valves V.

The recesses 12 noted above are each machined to provide an annular valve seat 14. Valve seat 14 includes a flow passage 16 communicating with outlet port P2 via metering orifice M, dimensioned in the manner described above. Each recess 12 also provides an annular region 18 surrounding valve seat 14, which region communicates with inlet port P1 via a short drilled passage 15. Passages 15 and 16 in this embodiment together with region 18 provide the flow lines L0, L1, . . . Ln described previously, each such flow line L having a respective metering orifice M therein.

Each solenoid control valve V0, V1, . . . Vn includes a solenoid coil 20 and an associated plunger 22. The end of the plunger 22 is provided with a valve disc 24 which mates with valve seat 14 to provide a good seal when the plunger 22 moves to the valve closed position. In the valve open position, inlet port P1 communicates with outut port P2 via flow line L including annular region 18, flow passage 15 and 16 and metering orifice M.

The valve-manifold arrangement described above is very compact and well suited for many applications, especially in cases where the system is applied to internal combustion engines. The manner of operation of this arrangement will readily be apparent having regard to the foregoing description.

Various types of quick-acting solenoid valves are commercially available such as Honeywell/Skinner V5 series valves (12 volt). These valves are provided with a flow metering option (RM), which option is not significant in the present case as each orifice is individually sized and drilled to provide the flow rate capacities referred to above.

An important consideration is the operating life of the solenoid control valves. Commercially available valves are specified as being capable of 20,000,000 operations at 10 cycles per second which would lead to a minimum life expectancy of 555 hours. At 60 miles per hour this would provide a minimum of 33,300 miles before expected valve failure. Statistically, valve life would be much better than the calculated minimum, some of the reasons for this being:

1. Valves change state under changing engine demand.
2. The valve V0 in the line of lowest fuel carrying capacity is the only valve in the series to respond to small changes.
3. The valve V0 could be electronically deleted under anything but idle conditions.
4. More exotic technology such as piezoelectric or magnetostrictive valves can be incorporated to improve valve speed and/or life expectancy.

A brief reference was made earlier to the electronic processor 2. For the convenience of those skilled in this art the following example describes one of many circuits that will provide the binary signals required to enable EDGAR to control the flow of fuel to an automobile engine. Analog manipulation of two input signals (air flow and RPM) is used in this particular example to determine the quantity of fuel delivered by EDGAR.

It must be emphasized that the input signals are by no means limited to two, nor is the processing circuitry limited to analog of the type shown. The system shown is practical and has been tested on a 454 cubic inch displacement (CID) engine.

The following definitions are relevant when considering the fuel requirements of an internal combustion engine:

(a) Sotichiometric—the "chemically correct" ratio of air to fuel that theoretically will ensure complete combustion of the supplied fuel with no oxygen remaining.
(b) Lean—a mixture of air/fuel that contains a surplus of air.
(c) Rich—a mixture of air/fuel that contains a surplus of fuel.
(d) Flamibility Limit—the range of air/fuel beyond which combustion will no longer be sustained.

The following definitions relate to the various stages of normal engine operation:

(a) Start—requires an air/fuel mixture of maximum flamibility.
(b) Idle—requires a "rich" mixture as a portion of the supplied fuel combines with exhaust gases in the intake manifold before reaching the combustion chamber.
(c) Cruise (Maximum Economy)—requires a "lean" mixture in order to optimise the use of air as the working fluid in the cylinder.
(d) Acceleration (maximum Power)—requires a "rich" mixture.
(e) Deceleration—a very lean mixture may be employed but the mixture must remain within the "flamibility limit". A mixture beyond the "flamibility limit" will fill the exhaust system with unburned fuel resulting in an explosion when combustion is restored. An option with EDGAR is to electronically command the fuel supply to zero during deceleration saving fuel without the problem of exhaust explosion.

Figure 7:
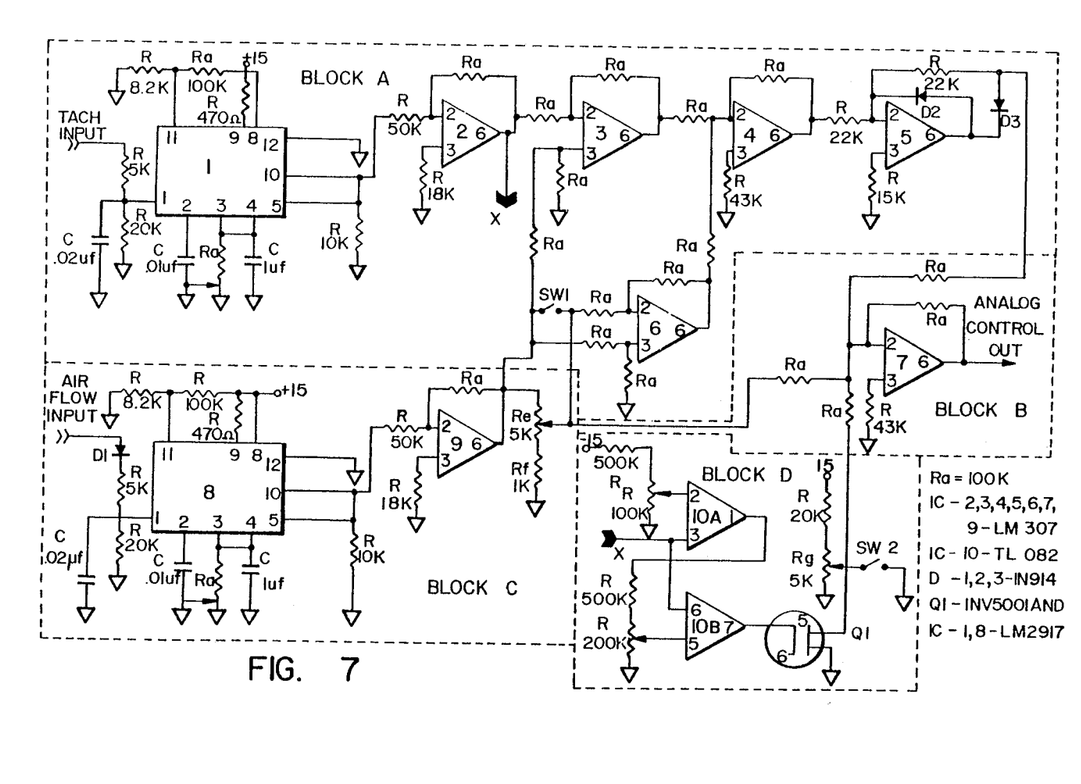
FIGS. 7 and 8 are schematic drawings of one form of electronic system.
Figure 8:
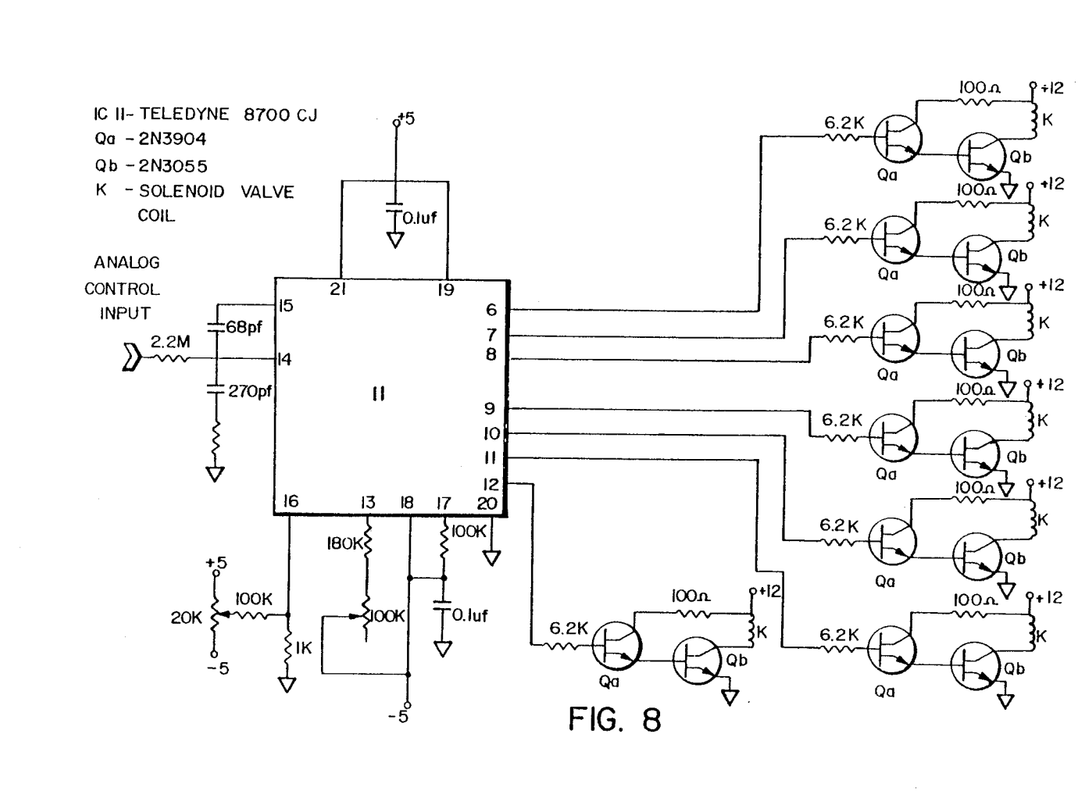

With the above definitions in mind reference will now be had to FIGS. 7 and 8 which are complete schematics of the electronic processor. FIG. 7 is divided into blocks to which the following description pertains.

Circuit block C provides a signal that is in direct proportion to air flow into the engine intake thus establishing an adjustable reference to which other modifiers can be added. Circuit block A provides a signal that reflects engine load and acts as a modifier to that produced by block C. Block D provides a modifier when the engine is operated within a set range of RPM indicative of idle, while block B sums the signals from blocks A, C and D to produce a composite signal that is applied to the analog to digital converter detailed in FIG. 8.

The above block functions are related to the several stages of engine operation as follows:

(a) Start—air flow signal is processed by block C and supplied to block B; blocks A and D are inactive.
(b) Idle—blocks C and D contribute to the input of block B. Block A is inactive.
(c) Cruise—block C is aided by a small contribution from block A as supplied to block B.
(d) Acceleration (Power)—block C is aided by a large contribution from block A as supplied to block B.
(e) Deceleration—block C supplies block B. Blocks A and D are inactive.

The above functions and the manner in which they are achieved will be apparent from the following description of the control circuitry illustrated in FIGS. 7 and 8.

IC1 and IC8 are National LM2917 frequency to voltage converters. IC1 converts ignition pulses to an analog voltage proportional to revolution per minute (RPM), a typical value being 0 to +5 volts output (pin 5,10) for an input range of 0 to 5000 RPM. IC2 inverts and amplifies the output of IC1 producing a voltage of 0 volts at 0 RPM progressing to −10 volts at 5000 RPM. Similarly IC8 converts pulses from an air flow meter (Chrysler part #4267128) to an 0 to +5 volt analog signal proportional to the wide open throttle (WOT) air demand over the RPM range.

IC9 inverts and amplifies the output of IC8 producing at its output (pin 6) a voltage that "tracks" the output of IC2 under WOT conditions. The output of IC9 is equal to the output of IC2 only under WOT conditions. For a given RPM a throttle setting less than WOT will produce a proportionally smaller voltage at the output of IC9 and the difference between the IC2 and IC9 output voltage appears at the output of IC3 as a positive going correction signal that accurately reflects engine load.

IC6 produces a negative going correction signal in the following way. The output of IC9 is applied to a voltage divider comprised of Re and Rf. The setting of Re determines the portion of the total voltage that is applied to the inverting input of IC6. The non-inverting input of IC6 is connected via a voltage divider to the output of IC9. This configuration of IC6 enables IC6 to amplify only the voltage appearing between the output of IC9 and the wiper of Re. IC6 output is negative going and is summed at the input of IC4 with the positive going signal from IC3. If the output of IC2 equals the output of IC9 (WOT conditions independent of RPM) no signal is supplied by IC3; therefore, IC4 amplifies only the signal supplied by IC6. At throttle settings progressively less than WOT the output of IC3 becomes progressively more positive and subtracts from the signal supplied by IC6, the output of IC4 being the algebraic sum of the outputs of IC3 and IC6. If the voltage contributed by IC3 is greater in magnitude than that contributed by IC6, the output of IC4 will go negative but will be prevented from appearing at the output of IC5 by the configuration of diodes in the feedback of IC5 (IC5 output "clamped" at 0 volts). If the magnitude of the voltage at the output of IC6 is greater than the magnitude at the output of IC3. IC5 acts as an inverting amplifier with a gain of one.

Returning to the voltage divider Re and Rf, the position of the wiper determines the portion of the voltage produced by IC9 that appears between the wiper and ground as does the same wiper determine the portion of the voltage produced by IC9 that is applied to IC6. The sum of the voltage applied to IC6 and IC7 must equal the output of IC9.

IC7 is simply a summing amplifier algebraically adding the outputs of IC5, Re and Rg. Re provides a voltage that is directly proportional to air flow and is the signal that meters fuel under "maximum economy" conditions. IC5 provides a modifying signal that adds to the signal provided by Re to increase the amount of fuel delivered when the engine is expected to produce maximum power.

Rg simply provides a voltage that is used to add the required amount of fuel to compensate for engine variables under idle conditions. In conjunction with the idle compensation, IC10A and IC10B form a "window" comparator by which the RPM range of the idle compensation circuit may be set.

The output of IC7 drives an analog to Digital Converter (ADC) (e.g. a Teledyne 8700CJ) which converts the positive going analog signal into a digital binary format. Two stages of transistor amplification for each bit of the ADC are provided by transistors $Q_a$, $Q_b$ in order to achieve sufficient current gain to drive the valves of V0, V1, V2 - - - Vn of EDGAR the solenoid coils K only of which are represented in FIG. 8.

The values of the various circuit resistors and capacitances are shown in FIGS. 7 and 8. The following table gives particulars of the other circuit components illustrated:

TABLE II

| IC #1,8 | LM 2917 |
| IC −2,3,4,5,6,7,9 | LM 307 |
| IC #10 | TL 082 |
| D #1,2,3 | IN 914 |
| Q1 | INV 5001 AND |
| IC #1 | TELEDYNE 8700-CJ |
| $Q_a$ | 2N 3904 |
| $Q_b$ | 2N 3055 |
| K | SOLENOID VALVE COIL |

Although the applicant's fluid control system has been described in the preceding exemplary embodiment in conjunction with fuel control for an internal combustion engine it is not so limited. It can, in fact, be advantageously utilized in many applications where a precise metering of gas flow is required. Under electronic control the resolution, accuracy and speed of response can be tailored to suit the particular requirements. Medical, aerospace, process control and welding are examples of the many areas where accurate gas metering is vital.

Some of the advantages of the applicant's system are as follows:

1. Gas is delivered to the engine under positive pressure independent of engine vacuum variations.

2. All computation and adjustment of gas flow is done by electronic circuitry with greater capability for refinement of control.
3. Mass produced EDGAR systems will be small, precise, reliable, and inexpensive.
4. EDGAR performance which follows a precise sequence of successive powers of two can be evaluated with an inexpensive flow meter.
5. The EDGAR system does not interfere with engine performance on gasoline since the gas mixer is small and offers no obstruction to air flow.

I claim:

1. Apparatus for controlling the rate of flow of a compressible fluid from a common inlet to a common outlet comprising:
   (a) means defining a plurality of fluid conducting lines;
   (b) means to connect said plurality of lines in parallel between said common inlet and said common outlet such that the total fluid flow from said common inlet to said common outlet is equal to the sum of the separate flows through the individual lines;
   (c) said plurality of lines being adapted to provide flow rates therethrough so related to one another as to be proportional to respective ones of a plurality of preselected numerical values when a differential pressure is maintained between said common inlet and said common outlet sufficient to provide choked flow conditions in said lines;
   (d) a control valve located in each of said lines with each said valve being operable to fully open and fully closed positions;
   (e) a control means adapted to control selectively the opening and closing of said valves, so that when fluid is supplied to said common inlet at a selected pressure such that the pressure differential between the common inlet and the common outlet is sufficient to create choked flow conditions in said lines, the total fluid flow passing outwardly of said common outlet is controlled in discrete steps in accordance with the opening and closing of said control valves to provide a plurality of predetermined total fluid flow rates at said common outlet.

2. Apparatus according to claim 1 wherein said preselected numerical values are powers of a selected number.

3. Apparatus according to claim 2 wherein said powers of a selected number are successive powers of two whereby said plurality of predetermined total flow rates are proportional to a series of binary numbers.

4. Apparatus as claimed in claim 3 further comprising an orifice in each of said fluid-conducting lines, which, when said fluid is supplied via said common inlet to said fluid-conducting lines at said selected pressure, each said orifice operates in choked flow condition when fluid is flowing in the associated line.

5. Apparatus as claimed in claim 3 including an orifice in each said fluid-conducting line and wherein the rate of fluid flow in each said fluid-conducting line under conditions of choked flow in such orifice is determined by the dimensions of the orifice therein to provide in each of said fluid-conducting lines a predetermined constant flow rate at said selected pressure at the common inlet, said flow rates being weighted so that the individual flow rates of the different lines are proportional to successive powers of two.

6. An apparatus as claimed in claim 5 wherein said control valves are electrically operated solenoid valves, and said control means comprises an electronic processor having a plurality of outputs each connected to a respective one of said solenoid valves, which processor emits digital signals corresponding to binary numbers for controlling said solenoid valves to provide total fluid flow at said common outlet directly proportional to the values of said binary numbers.

7. An apparatus as claimed in claim 6 wherein said fluid is a gas and wherein each said orifice is sized so that said flow rate therethrough is proportional to the weight of the binary digit of the digital signal by which its associated control valve is activated.

8. An Apparatus as claimed in claim 6, wherein said fluid is fuel for an internal combustion engine and said electronic processor is adapted to respond to signals representative of operating parameters of said internal combustion engine.

9. An apparatus as claimed in claim 3, wherein said control valves are electrically operated solenoid valves for controlling a gaseous fluid, said control means being an electronic processor having a plurality of outputs, each of said outputs being electrically connected to the solenoid of a respective one of said control valves, said electronic processor providing digital signals to each said solenoid thereby to control automatically the opening and closing of said control valves.

10. An apparatus as claimed in claim 1 wherein said fluid is fuel for an internal combustion engine and said common outlet communicates with the air/fuel mixer of said engine.

11. An apparatus as claimed in claim 1 wherein the flow rate of a first one of said fluid-conducting lines at the selected inlet pressure is a predetermined value equal to one of said discrete steps, and the flow rates of the others of said fluid-conducting lines form a series comprising successive multiples of two times the flow rate of the preceding fluid-conducting line of the series whereby the fluid flow rate of each of said fluid-conducting lines is a weighted value representative of the position thereof in said series.

12. Apparatus for controlling the rate of flow of fluid as claimed in claim 1 wherein said fluid is selected from the group comprising methane and propane.

13. An electronically controlled system to supply compressible fuel to an internal combustion engine comprising:
a plurality of fuel-conducting lines connected in parallel between a common input and a common output such that the total fuel flow from said common input to said common output is equal to the sum of the separate flows through the individual fuel conducting lines, the latter adapted to provide fuel flow rates therethrough so related to one another as to be proportional to successive powers of two under conditions of choked flow in said lines;
a solenoid control valve located in each of said fuel-conducting lines, each said solenoid control valve being operable to fully open and fully closed positions;
an electronic processor for providing binary signals via a plurality of outputs each connected to a respective one of said solenoid control valves to control selectively the opening and closing of each of said valves by means of the digital signals applied to the solenoids thereof;
sensor means to generate electrical signals indicative of operating parameters of said internal combustion engine and to apply said electrical signals to said electronic processor;
an air/fuel mixer having an input to which the common output of said plurality of fuel-conducting lines is connected and an air/fuel mixer output which is connected to said internal combustion engine; and
means to supply fuel to said common input of said plurality of fuel-conducting lines at a pressure selected to provide a pressure difference between said common input and common output sufficiently high that fuel flow in each of said lines is independent of the back pressure at the input to said air/fuel mixer thus providing the choked flow in said lines, with said electronic processor adapted to automatically adjust the combined fuel flow from said plurality of fuel-conducting lines in a series of discrete steps by selectively opening and closing said valves to provide total flows at said common output which are directly proportional to the values of said binary signals in response to the fuel requirements of said internal combustion engine as indicated by the electrical signals generated by said sensors.

14. An electronically controlled fuel system as claimed in claim 13 wherein said fuel is selected from the group comprising methane and propane.

15. An electronically controlled fuel system as claimed in claim 13, wherein the fuel flow rate of one of said fuel-conducting lines is a predetermined value equal to one of said discrete steps, said predetermined value being a function of the fuel consumption of said internal combustion engine, and wherein the fuel flow rates of the other fuel-conducting lines under choked flow conditions form a series comprising successive multiples of two times the flow rate of the preceding one of said fuel-conducting lines in the series.

16. An electronically controlled fuel system as claimed in claim 13 wherein said fuel is a combustible gas.

17. An electronically controlled fuel system as claimed in claim 16 wherein said means to supply fuel to said plurality of fuel-conducting lines comprises a high-pressure fuel storage tank, and a pressure regulating means connected between said fuel storage tank and said plurality of fuel-conducting lines.

18. An electronically controlled fuel system as claimed in claim 16 further comprising an orifice in each of said fuel-conducting lines which orifice operates in choked flow condition when fuel is flowing in the associated line, and wherein each said orifice is sized in proportion to the binary number of the digital signal by which the associated control valve is activated.

19. An electronically controlled fuel system as claimed in claim 18 wherein the rate of flow of fuel in each of said fuel-conducting lines is determined by the dimensions of the orifice therein, said orifices being designed so as to provide in each of said fuel-conducting lines a predetermined constant flow rate at a constant fuel supply pressure adequate to maintain choked flow conditions in said orifices, said flow rate being weighted so that the individual flow rates of the different fuel-conducting lines are proportional to the terms of the series $2^0, 2^1, 2^2 \ldots 2^n$, where $n+1$ is the number of fuel-conducting lines.

20. An electronically controlled system for regulating the rate of flow of compressible fluid from a common source to a common user comprising:

a plurality of fluid-conducting lines arranged in parallel and connected between said common source and said common user such that the total fluid flow from said common source to said common user is equal to the sum total of the separate flows through the individual fluid-conducting lines, said lines being adapted to provide flow rates therethrough so related to one another as to be proportional to respective members of a group of selected increasing values when a differential pressure between said common source and said common user is maintained at or above a critical level sufficient to provide choked flow conditions in said lines;

a solenoid control valve located in each of said fluid-conducting lines, each said solenoid control valve being operable to fully open and fully closed positions;

sensor means to generate electrical signals indicative of operating parameters of said common user;

an electronic processor having input means connected to said sensor means and a plurality of outputs each connected to an associated one of said solenoid control valves, said electronic processor being adapted to respond to the signals fed to its input means by emitting output signals via said output means to open and close the individual said solenoid valves so as to vary the sum total of the fluid flow through said fluid conducting lines to said common user in a series of discrete steps in accordance with the operating parameters of said common user.

21. The electronically controlled system of claim 20 wherein said selected increasing values are increasing powers of a selected number.

22. The electronically controlled system according to claim 21 wherein said powers of a selected number comprise successive powers of two with the sum totals of said fluid flows being proportional to a series of binary numbers, and an orifice in each of said fluid-conducting lines, which orifice operates in choked flow condition when fluid is flowing in the associated line under the influence of the pressure differential thereacross at or above the critical level and said electronic processor emitting digital signals corresponding to binary numbers to selectively open and close said valves, each said orifice being sized in proportion to the weight of the binary digit corresponding to the digital signal by which the control valve in the associated fluid line is activated.

23. An electronically controlled system as in claim 22 wherein the rate of flow of fluid in each of said fluid-conducting lines is determined by the dimensions of the orifice therein, said orifices being dimensioned so as to provide in each of said fluid-conducting lines under choked flow conditions a predetermined constant flow rate with constant source pressure, said flow rate being weighted so that the individual flow rates of the different fluid-conducting lines are proportional to the terms of the series $2^0, 2^1, 2^2, \ldots 2^n$, where $n+1$ is the number of fluid-conducting lines.

24. An electronically controlled system as claimed in claim 20, wherein said fluid is a combustible gas.

25. An electronically controlled system as claimed in claim 20 wherein said fluid is a gas and said means to supply fluid to said plurality of fluid-conducting lines comprises a high-pressure gas storage tank, and a pressure regulating means connected between said gas storage tank and said plurality of fluid-conducting lines.

26. An electronically controlled system as claimed in claim 20 including a common user comprising an internal combustion engine and wherein said sensors are adapted to generate signals representing the fuel requirements of the engine under various operating conditions.

27. An electronically controlled system as claimed in claim 20 including a common user comprising an internal combustion engine and wherein said sensors are adapted to generate signals representing the fuel requirements of the engine under various operating conditions and an air/fuel mixture having an input connected to receive the combined output of said plurality of fluid conducting lines and an output connected to the intake of said internal combustion engine, said fluid being a gaseous fuel.

28. A method of controlling the rate of flow of a compressible fluid between a common source and a common user, the flow requirements of the user being subject to fluctuation in accordance with selected operating conditions thereof, said method comprising:

(a) providing a plurality of fluid conducting lines in parallel between the common source and the common user such that, in operation, the total fluid flow from said common source to said common user is equal to the sum total of the separate flows through the individual fluid conducting lines, the relative flow rates through said lines being proportional to successive powers of a number when a pressure difference is maintained between said common source and said common user at or above a critical level sufficient to provide choked flow conditions in said lines; each said line having a respective control valve therein operable to fully open and fully closed positions;

(b) maintaining said pressure difference at or above the critical level;

(c) generating electrical signals in response to the selected operating conditions of the common user;

(d) feeding said signals into a programmed control means with the latter responding thereto by emitting valve control signals related to the flow requirements of the common user;

(e) supplying said control valves with said signals to open and close the same so that the total fluid flow from the common source to the common user is controlled in discrete steps.

29. The method of claim 28 wherein said number is two.

30. The method of claim 29 wherein said valve control signals are binary digital signals.

31. The method of claim 28 wherein said fluid is a combustible gas.

* * * * *